United States Patent
Quehenberger et al.

(10) Patent No.: US 10,544,838 B2
(45) Date of Patent: Jan. 28, 2020

(54) CLUTCH ASSEMBLY AND METHOD FOR DECOUPLING A FIRST SUB-REGION OF A POWERTRAIN FROM A SECOND SUB-REGION OF THE POWERTRAIN BY MEANS OF THE CLUTCH ASSEMBLY

(71) Applicant: Magna Powertrain GmbH & Co KG, Lannach (AT)

(72) Inventors: Johannes Quehenberger, Raaba (AT); Johann Willberger, Graz (AT)

(73) Assignee: MAGNA POWERTRAIN GMBH & CO KG, Lannach (AT)

( * ) Notice: Subject to any disclaimer, the term of this patent is extended or adjusted under 35 U.S.C. 154(b) by 103 days.

(21) Appl. No.: 15/742,119

(22) PCT Filed: Jun. 14, 2016

(86) PCT No.: PCT/EP2016/063549
§ 371 (c)(1),
(2) Date: Jan. 5, 2018

(87) PCT Pub. No.: WO2017/005459
PCT Pub. Date: Jan. 12, 2017

(65) Prior Publication Data
US 2018/0209487 A1    Jul. 26, 2018

(30) Foreign Application Priority Data
Jul. 7, 2015    (DE) .................. 10 2015 212 694

(51) Int. Cl.
*F16D 11/14*    (2006.01)
*F16D 23/12*    (2006.01)
(Continued)

(52) U.S. Cl.
CPC .............. *F16D 11/14* (2013.01); *B60K 23/08* (2013.01); *F16D 21/00* (2013.01); *F16D 23/12* (2013.01);
(Continued)

(58) Field of Classification Search
CPC .......... F16D 11/14; F16D 23/12; F16D 23/14; F16D 25/2025; F16D 2023/123
See application file for complete search history.

(56) References Cited

U.S. PATENT DOCUMENTS 5,353,902 A * 10/1994 Flowtow ................. F16D 23/12
192/84.6
2005/0277500 A1    12/2005 Bitzer et al.
(Continued)

FOREIGN PATENT DOCUMENTS

CN    201836262 U    5/2011
CN    103158865 A    6/2013
(Continued)

OTHER PUBLICATIONS

International Search Report and Written Opinion dated Sep. 28, 2016 from International Patent Application No. PCT/EP2016/063549 (with English translation of International Search Report).
(Continued)

*Primary Examiner* — Stacey A Fluhart
(74) *Attorney, Agent, or Firm* — Dickinson Wright PLLC

(57) ABSTRACT

The invention relates to a clutch assembly for a powertrain of a motor vehicle, comprising at least one clutch and at least one actuation device. The clutch can be brought into an open position and/or a closed position by means of the actuation device such that a first sub-region of the powertrain and a second sub-region of the powertrain are decoupled and/or coupled. The actuation device comprises an actuation element and a control element which is connected to the clutch.
(Continued)

The control element is arranged in a guidable manner in a guide slot with respect to the actuation element, and the control element is held in the region of the guide slot by means of an energy storage element, which counteracts a movement of the control element out of a first stop position along the guide slot, in the closed position of the clutch. The invention also relates to a method for decoupling the first sub-region of the powertrain from the second sub-region of the powertrain by means of the clutch assembly.

15 Claims, 9 Drawing Sheets

(51) Int. Cl.
    *F16D 23/14*      (2006.01)
    *F16D 21/00*      (2006.01)
    *B60K 23/08*      (2006.01)
    *F16H 25/20*      (2006.01)
    *F16H 48/08*      (2006.01)

(52) U.S. Cl.
    CPC ......... *F16D 23/14* (2013.01); *F16H 25/2025* (2013.01); *F16D 2023/123* (2013.01); *F16H 48/08* (2013.01)

(56) References Cited

U.S. PATENT DOCUMENTS

| | | | |
|---|---|---|---|
| 2010/0107811 A1* | 5/2010 | McCloy | B60K 17/3467 74/665 F |
| 2014/0174215 A1 | 6/2014 | Dow et al. | |
| 2017/0241486 A1* | 8/2017 | Pritchard | B60K 17/02 |

FOREIGN PATENT DOCUMENTS

| | | |
|---|---|---|
| CN | 103702851 A | 4/2014 |
| CN | 103747976 A | 4/2014 |
| CN | 103842201 A | 6/2014 |
| CN | 104074882 A | 10/2014 |
| CN | 104670011 A | 6/2015 |
| DE | 10238118 A1 | 4/2003 |
| DE | 102009005358 A1 | 7/2010 |
| EP | 1515415 A2 | 3/2005 |
| WO | WO2008101742 A1 | 8/2008 |
| WO | WO2011098595 A1 | 8/2011 |
| WO | WO2013186076 A1 | 12/2013 |
| WO | WO2015032396 A1 | 3/2015 |
| WO | WO2015075183 A1 | 5/2015 |

OTHER PUBLICATIONS

Search Report dated Dec. 15, 2018 from corresponding Chinese Patent Application No. 2016800399428.

* cited by examiner

CLUTCH ASSEMBLY AND METHOD FOR DECOUPLING A FIRST SUB-REGION OF A POWERTRAIN FROM A SECOND SUB-REGION OF THE POWERTRAIN BY MEANS OF THE CLUTCH ASSEMBLY

CROSS-REFERENCE TO RELATED APPLICATIONS

This application is a National Stage of International Application No. PCT/EP2016/063549, filed Jun. 14, 2016, which claims priority to German Application No. 102015212694.3 filed Jul. 7, 2015. The entire disclosure of each of the above applications is incorporated herein by reference.

FIELD OF THE INVENTION

The present invention relates to a coupling assembly for a powertrain of a motor vehicle, comprising at least one clutch and at least one actuation device for selectively actuating the clutch, and a method for decoupling a first section of the powertrain from a second section of the powertrain by means of the coupling assembly.

BACKGROUND OF THE INVENTION

This sections provides background information related to the present disclosure which is not necessarily prior art.

Such coupling assemblies are known in various embodiments in vehicle technology and usually serve for decoupling and/or coupling sections of the powertrain of a motor vehicle.

In particular, coupling assemblies of the generic type are used in all-wheel drive motor vehicles and in motor vehicles with hybrid drive. They serve in particular for deactivating sections of the powertrain, in order to prevent unnecessary corotation and thus unnecessary energy consumption of the sections of the powertrain being deactivated.

PCT Patent Application No. WO 2011/098595 A1 thus describes a coupling assembly of the generic type. In this system an actuating mechanism is formed for actuating a clutch, the actuating mechanism selectively bringing an engaging portion into engagement with a threaded portion that co-rotates with a shaft. In this way, a relative movement is effected of the engaging portion and the threaded portion along an axis of the rotating shaft, thus resulting in the clutch being displaced (decoupled) in the axial direction.

Similarly, PCT Patent Application No. WO 2013/186076 A1 describes a power transmission unit having an integrated disconnect mechanism. The disconnect mechanism comprises a positive-locking clutch, in which a sliding sleeve interacts in a positive-locking manner with another shaft component. The actuating mechanism for actuating the clutch is a sector nut. The sector nut is brought into engagement, by way of an actuator, with a thread in the input shaft. The thread runs in such a way that the sector nut engaged by the actuator displaces the sliding sleeve in the decoupling direction.

German Patent Application No. DE 10 2009 005 358 A1, for example, describes a powertrain for a motor vehicle having a full-time driven primary axle that includes a drive unit for generating a drive torque, and a first clutch for transferring a variable portion of the drive torque to a secondary axle of the motor vehicle. In addition, the powertrain has a second clutch for deactivating a torque-transmitting portion of the powertrain arranged between the first clutch and the second clutch, when the first clutch is open.

The aforementioned coupling assemblies serve for reversibly deactivating sections of the powertrain of a motor vehicle, in particular a secondary section of a powertrain. In order to ensure a positive decoupling of the clutch and thus positive deactivation of a section of the powertrain, the threaded portion of the actuation device is always connected in a rotationally fixed manner to a shaft that always rotates when the vehicle is in motion. In other words, the threaded portion of the actuation device of the coupling assembly is always arranged on a section not adapted to be deactivated of the powertrain of the motor vehicle. This solution often requires a relatively large installation space and complex integration into the powertrain.

If, in the embodiments described in the prior art, the threaded portion were to be arranged on a shaft or construction element and/or sub-assembly of the powertrain that comes to a standstill while vehicle is in motion, or in a powertrain section to be deactivated, the following effect could occur: the decoupling process of the clutch is started and the clutch will be opened until it becomes disengaged—the section to be deactivated of the powertrain comes to a standstill, but the decoupling process is not fully completed, as a result of which, for example, a rasping noise on the clutch may occur.

Furthermore, all of the above coupling assemblies of the prior art are sensitive to excessive torque introduced by way of the threaded portion. For example, it has not been possible so far to integrate the threaded portion on a differential case, because the torque required for the clutch to be opened for positive rotation of the differential case, if it were too high, is acoustically perceptible during decoupling of the clutch as a powertrain decompression shock.

SUMMARY OF THE INVENTION

This section provides a general summary of the disclosure, and is not a comprehensive disclosure of its full scope or all of its features.

It is an object of the present invention to improve a coupling assembly of the aforementioned type with respect to installation space and costs, and in particular so as to ensure a reliable, torque-independent actuation of the clutch from a closed position to an open position. It is a further object of the invention to present a method for a simple, reliable and torque-independent actuation of the clutch from a closed position to an open position.

The first aspect of the object is achieved by a coupling assembly for a powertrain of a motor vehicle, comprising at least one clutch and at least one actuation device, the clutch being adapted to be brought into an open position and/or closed position by means of the actuation device such that a first section of the powertrain and a second section of the powertrain are decoupled and/or coupled, the actuation device comprising an actuation element and a control element which is connected to the clutch, the control element being arranged in a guidable manner in a guide slot with respect to the actuation element, and the control element being held in the region of the guide slot by means of an energy storage element, which counteracts a movement of the control element out of a first stop position along the guide slot, in the closed position of the clutch.

According to the present invention, the coupling assembly comprises at least one clutch and at least one actuation device.

According to the present invention, the clutch is adapted to be actuated by the actuation device to an open position and/or a closed position.

According to the present invention, the clutch serves for coupling and/or decoupling a first section of a powertrain of a motor vehicle to/from a second section of the powertrain of the motor vehicle.

A transmission of power (torque transmission) substantially takes place from the first section of the powertrain to the second section of the powertrain.

The closed position of the clutch describes a state of the clutch in which the first section of the powertrain of the motor vehicle is drivingly connected by means of the clutch to the second section of the powertrain. In this way, a transmission of power is effected by means of the clutch from the first section of the powertrain to the second section of the powertrain.

In the closed position of the clutch, substantially all of the component parts and/or sub-assemblies of the first section of the powertrain and of the second section of the powertrain are involved in the transmission of power.

The open position of the clutch describes a state of the clutch in which the first section of the powertrain is separated from the second section of the powertrain via the clutch. In this position, no power is transmitted from the first section of the powertrain to the second section of the powertrain.

In the open position of the clutch, substantially all of the component parts and/or sub-assemblies of the first section of the powertrain are involved in the transmission of power.

According to the present invention, the actuation device comprises an actuation element and a control element.

The control element is connected by way of a sliding element to the clutch and is preferably designed to be pivotable about a pivot axis.

According to the invention, the control element is arranged in a guidable manner in a guide slot with respect to the actuation element.

The guiding direction of the actuation element corresponds to the structural design of the guide slot.

According to the present invention, in the closed position of the clutch, the control element is held in the region of the guide slot by means of an energy storage element, which counteracts a movement of the control element out of a first stop position along the guide slot.

The configuration according to the present invention of the coupling assembly makes it possible to implement a reliable actuation of the clutch from a closed position to an open position and thus decoupling of the first section of the powertrain from the second section of the powertrain. The embodiment of the coupling assembly in accordance with the present invention achieves, in particular, a no-load, torque-independent decoupling of the first section of the powertrain from the second section of the powertrain, and an improved NHV (noise, vibration and harshness) behavior.

In addition, the solution according to the present invention can be implemented in a simple manner, cost-effectively, and optimized in terms of installation space.

The configuration and arrangement according to the present invention of the first stop position and energy storage element in the region of the guide slot ensures that the clutch can be actuated quickly from an open position to a closed position (coupling of the first section of the powertrain to the second section of the powertrain).

In general, the configuration of the compact coupling assembly according to the present invention facilitates integrating the coupling assembly into the powertrain, thereby enabling a more cost and time-effective manufacturing process.

Refinements of the invention are illustrated in the subclaims, the description and the accompanying drawings.

Preferably, the guide slot is formed on a first end portion of the actuation element, the control element engaging in the guide slot of the actuation element. The actuation element is thus arranged in the guide slot in a guidable manner on the control element.

Preferably, the guide slot is formed along the longitudinal axis of the actuation element.

Preferably, the guide slot is formed as a groove, in an oblong, elongated-hole-like manner.

In place of a groove, an oblong guide rail may advantageously be formed as the guide slot.

By forming the guide slot on the actuation element, an additional degree of freedom is obtained in the movement for the control element.

Preferably, the first stop position is formed by a first guide slot end.

The energy storage element is preferably embodied as a resilient element, in particular as a spring element.

Advantageously, the energy storage element is arranged within the guide slot.

Arranging the energy storage element and the first stop position in an integrative manner in/within the guide slot ensures, inter alia, a compact and straightforward design.

Particularly preferably, the actuation element is supported by way of a resilient contact element on an outer housing.

The resilient contact element is preferably likewise formed as a spring element.

Preferably, the actuation device has an engaging portion and a threaded portion, the engaging portion being adapted to be brought into engagement with the threaded portion.

The threaded portion is formed such that the actuating lever, on engagement of the engaging portion with the threaded portion, is adapted to be moved relative to the threaded portion in an axial direction.

As used herein, the directional term "axial" substantially describes a direction along the longitudinal axis and/or parallel to the longitudinal axis of the actuation element.

Analogously, the directional term "radially" substantially describes a direction normal to the longitudinal axis of the actuation element.

Preferably, the threaded portion is formed as a screw thread or a groove extending in a screw-like manner.

The engaging portion has a structural shape corresponding to that of the threaded portion, so as to enable a reliable positive-locking engagement of the engaging portion with the threaded portion.

The threaded portion is preferably arranged on a differential housing in a non-rotatable and not axially displaceable manner.

Upon actuating the clutch from a closed position to an open position (decoupling process), a displacement force acts on the actuation element by way of the threaded portion.

The arrangement of the threaded portion on a differential housing enables a particularly compact design of the coupling assembly according to the present invention. In addition, such a design allows for easy integration of the coupling assembly into the powertrain of the motor vehicle.

In a particularly advantageous embodiment variant of the present invention the differential housing is adapted to be drivingly coupled by means of the clutch to a differential shaft or differential shaft support.

If a differential shaft support is present, it is fixedly connected to the differential shaft.

Differential shafts and optionally the differential shaft support are arranged movable within the differential housing.

The engaging portion is preferably formed on a second end portion of the actuation element.

Preferably, the engaging portion is adapted to be brought into engagement with the threaded portion by means of an actuator unit.

Advantageously, the actuator unit is formed as a linear drive unit which can be electrically actuated.

The linear drive unit is preferably a solenoid or a linear motor.

Such an actuator unit is easy to control and is a cost-effective alternative to an electric motor.

Other possible actuator units include hydraulically or pneumatically operated systems.

In an advantageous embodiment variant of the present invention, a guide element is adapted to be actuated by means of the actuator unit, the guide element in turn being adapted to actuate the actuation element, thereby enabling the engaging portion to be brought into engagement with the threaded portion.

The guide element, also, is considered part of the actuation device.

Preferably, a locking shoulder is formed on the second end portion of the actuation element, on the side of the actuation element remote from the engaging portion.

The side of the actuation element remote from the engaging portion is a side nearer the actuator unit and/or the guide element.

Preferably, the clutch of the coupling assembly according to the present invention is formed as a positive-locking clutch, for example a dog clutch.

The second aspect of the object is achieved by a method for decoupling a first section of a powertrain from a second section of the powertrain by means of a coupling assembly, wherein the powertrain has a main clutch for selective transmission of a main clutch torque from a primary driveline of the powertrain to a secondary driveline of the powertrain, and wherein the coupling assembly is arranged in the secondary driveline and has at least one clutch, at least one actuation device and at least one actuator unit, wherein decoupling of the first section of the powertrain from the second section of the powertrain is actuated by the actuator unit acting on the actuation device while the main clutch is closed, such that main clutch torque is transmitted by way of the main clutch from the primary driveline to the secondary driveline.

Decoupling or the decoupling process of the first section of the powertrain from the second section of the powertrain corresponds, according to the present invention, to an actuation of the clutch from a closed position to an open position.

The powertrain has a main clutch for selective transmission of main clutch torque from a primary driveline of the powertrain to a secondary driveline of the powertrain.

According to the present invention, the coupling assembly is arranged in the secondary driveline.

According to the invention, the coupling assembly has at least one clutch, at least one actuation device and at least one actuator unit.

Decoupling the first section of the powertrain from the second section of the powertrain is actuated according to the present invention by the actuator unit acting on the actuation device while the main clutch is closed, such that main clutch torque is transmitted by way of the main clutch from the primary driveline to the secondary driveline.

The method for decoupling a first section of a powertrain from a second section of a powertrain according to the present invention brings about in particular a reliable, torque-independent decoupling of the first section of the powertrain from the second section of the powertrain.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

The present invention will now be described by way of example with reference to the drawings.

DETAILED DESCRIPTION OF THE INVENTION

Figure 1:
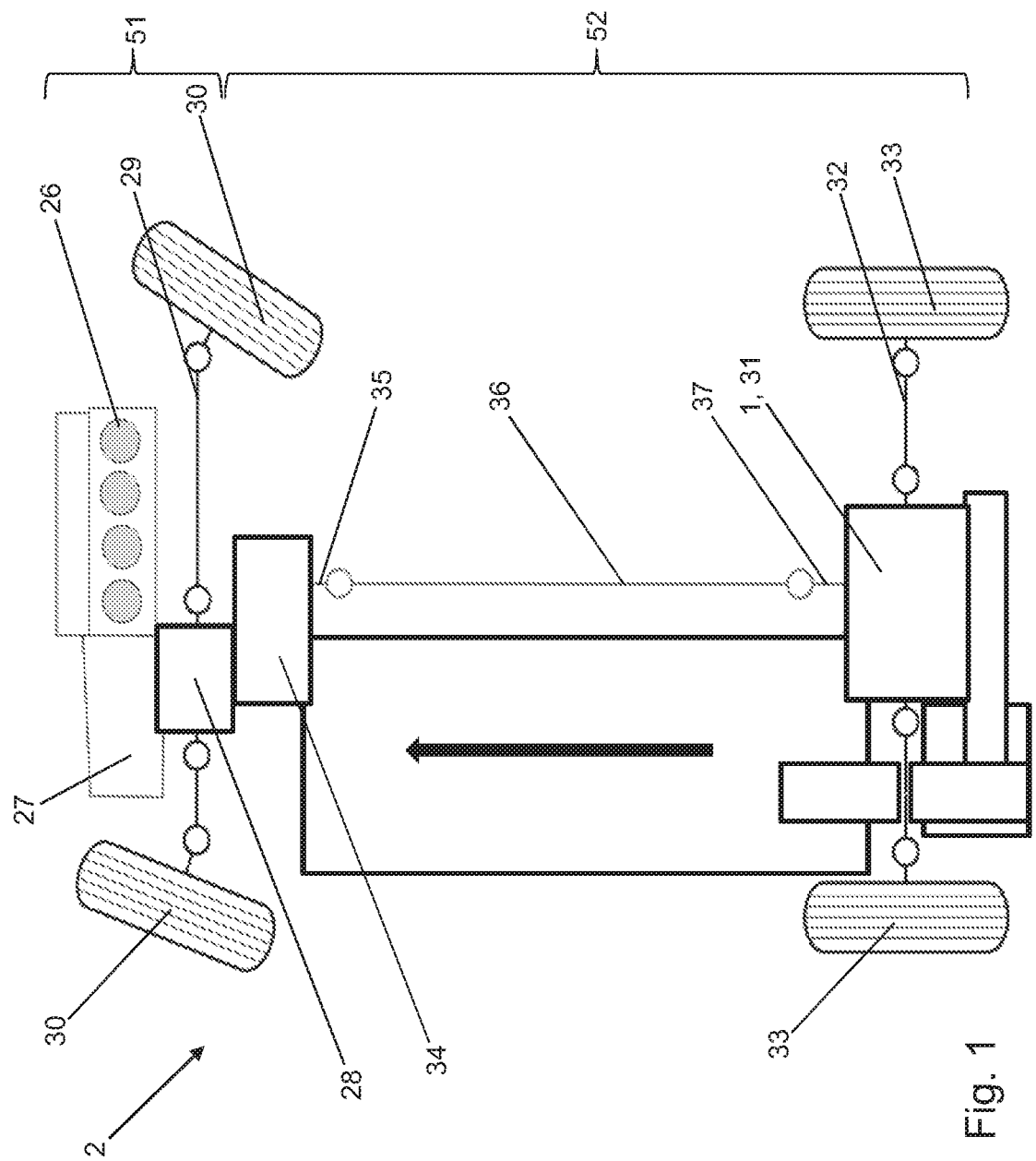
FIG. 1 schematically shows an exemplary powertrain of a motor vehicle with a coupling assembly according to the present invention.

The figures described below all show the coupling assembly 1 according to the invention by way of example with reference to an application in a differential.

Like and/or functionally similar elements are indicated by like reference numerals.

For a more detailed explanation of the mode of functioning of the coupling assembly 1 of the present invention, FIG. 1 shows an exemplary powertrain 2 of a motor vehicle. The motor vehicle is an optionally all-wheel driven vehicle.

The arrow shown in FIG. 1 indicates the forward driving direction of the motor vehicle.

In the exemplary powertrain 2 shown, a drive unit 26 is arranged transversely to the longitudinal axis of the motor vehicle, in the front region of the motor vehicle.

As previously mentioned, the powertrain 2 illustrated in FIG. 1 represents merely one exemplary way of using the coupling assembly 1 according to the present invention. It is also conceivable to use the coupling assembly 1 according to the present invention in a powertrain 2 in which the drive unit 26 is arranged in the direction of the longitudinal axis of the motor vehicle, or in a hybrid powertrain of a motor vehicle.

In the present powertrain 2, the drive unit 26 is an internal combustion engine.

The drive unit 26 is full-time connected by way of a variable-speed transmission 27 to a front-axle differential 28, the front-axle differential 28 being arranged on a front axle 29 of the motor vehicle.

In this way, front wheels 30 arranged on the front axle 29 are full-time driven—the front axle 29 thus constitutes the primary drive axle.

This section of the powertrain 2 may be referred to as the primary driveline 51.

In the rear region of the powertrain 2 of the motor vehicle, a rear axle 32 with a rear-axle differential 31 and rear wheels 33 is arranged.

The rear axle 32 forms the secondary drive axle of the powertrain 2, since it is driven by the drive unit 26 only when needed.

This section of the powertrain 2 may be referred to also as the secondary driveline 52.

In order to transmit drive torque from the drive unit 26 to the rear axle 32 only when needed, a controllable main clutch 34 is arranged in the front region of the motor vehicle, by means of which an adjustable proportion of the drive torque provided by the drive unit 26 is transferred to the rear axle 32.

The main clutch 34, also, can be considered to be part of the secondary driveline 52.

The main clutch 34 may be embodied, for example, as a friction clutch, dog clutch, or a coupling element with positive engagement.

An output element 35 of the main clutch 34 is drivingly connected to one end of a torque-transmitting element 36, in the present case a propeller shaft. On its other end, the torque-transmitting element 36 is drivingly connected to the rear-axle differential 31. The torque-transmitting element 36 is connected in this case to an input element 37, for example to a bevel gear, which is in engagement with a ring gear 38 of the rear-axle differential 31.

The rear-axle differential 31 has a differential housing 20, the differential housing 20 being fixedly connected to the ring gear 38 (FIGS. 2-9).

In the exemplary embodiment shown, the coupling assembly 1 according to the present invention is arranged on the rear-axle differential 31 and thus in the region of the secondary driveline 52.

Transmission of power (torque transmission), in the present exemplary powertrain 2 (FIG. 1), takes place from the drive unit 26 in the front region of the motor vehicle, full-time to the front axle 29 and selectively to the rear axle 32.

The torque-transmitting element 36 and the primary driveline 51 of the exemplary powertrain 2 are adapted to be drivingly coupled by means of the main clutch 34.

Figure 2:
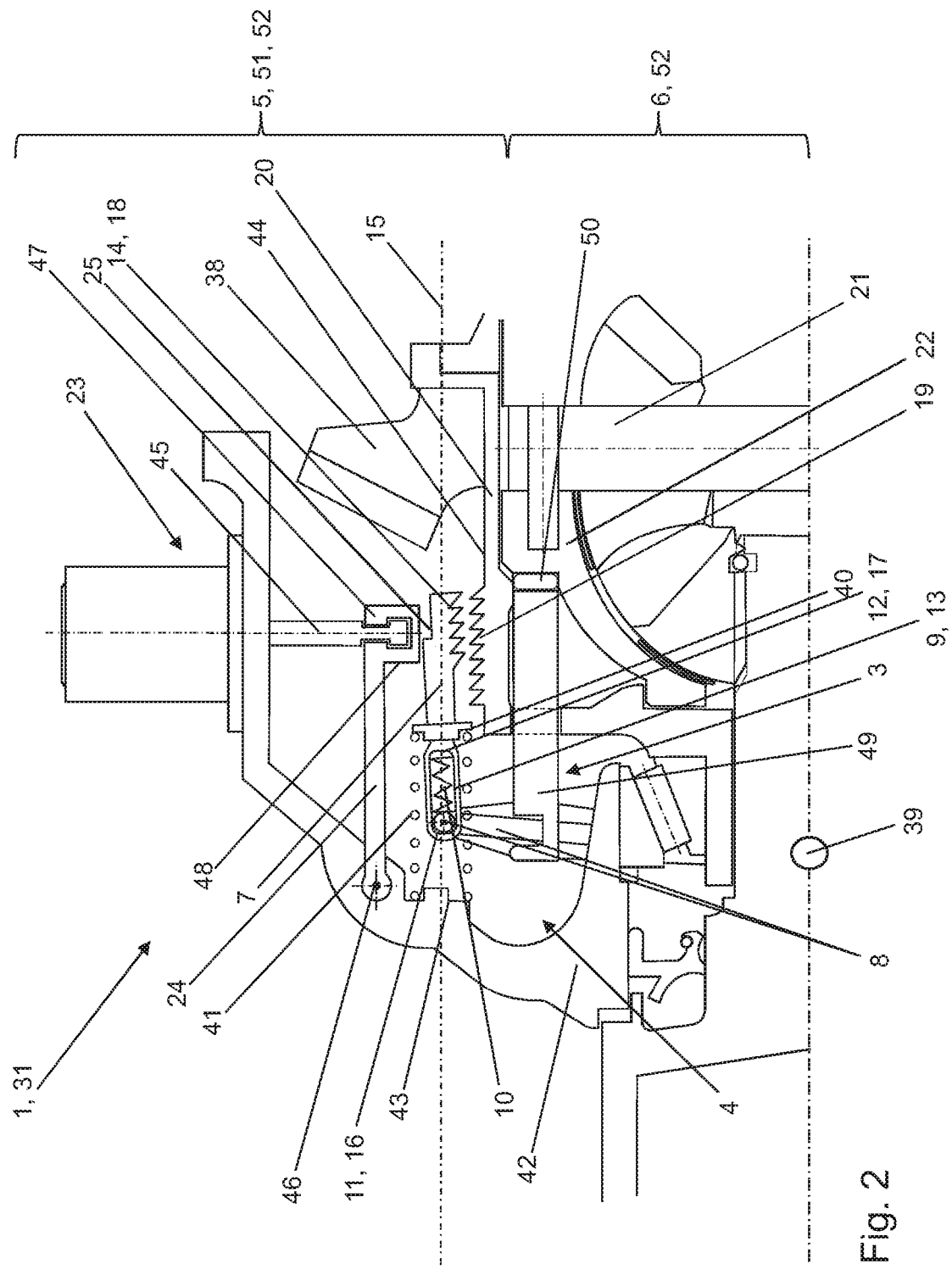
FIG. 2 shows an exemplary coupling assembly with a clutch in the closed position.

FIG. 2 shows the coupling assembly 1 according to the present invention in a closed position of the clutch 3. In this position, according to the present invention, a first section 5 of the powertrain 2 is coupled to a second section 6 of the powertrain 2.

Figure 3:
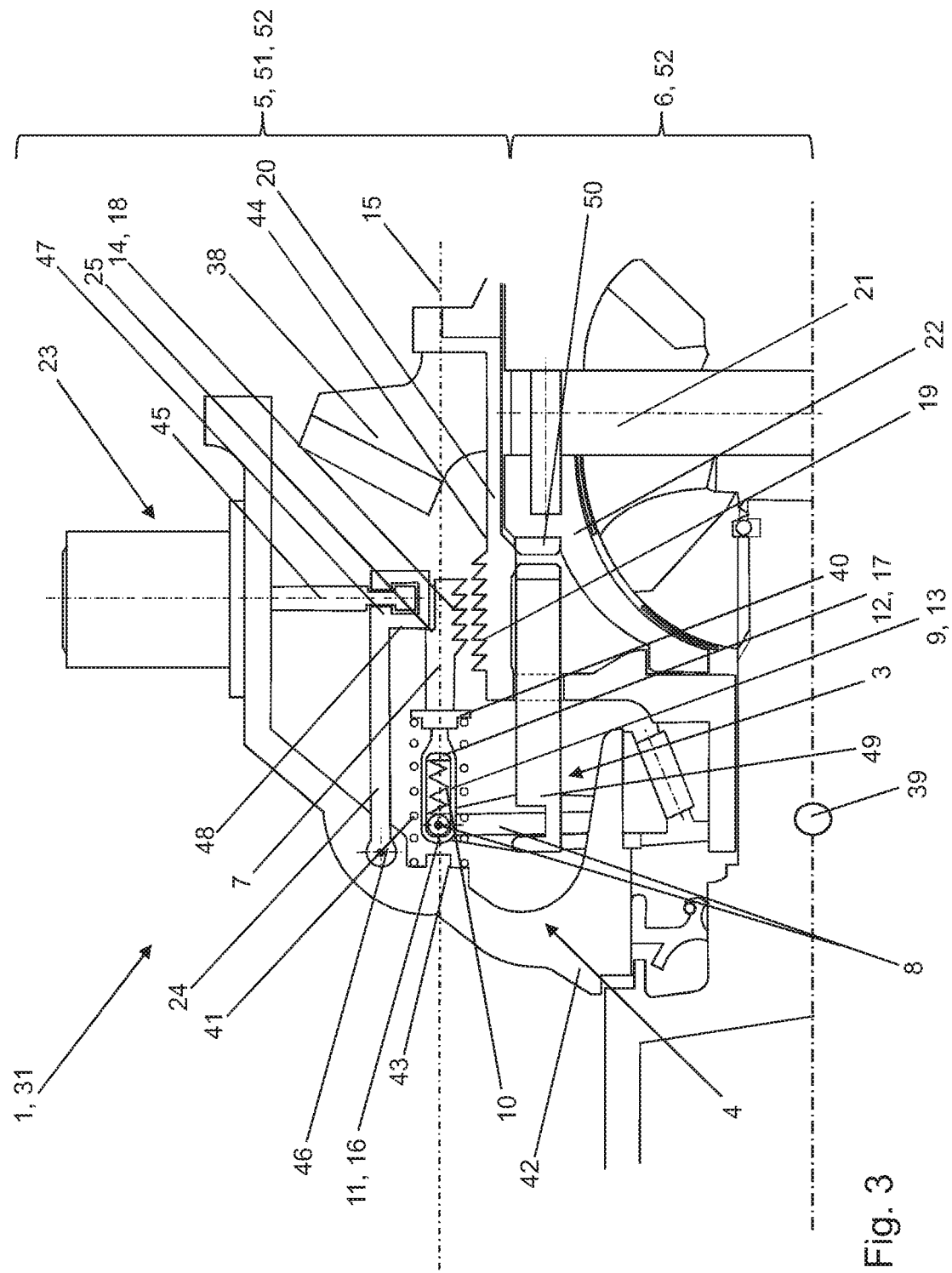
FIG. 3 shows an exemplary coupling assembly with the clutch in the open position.

FIG. 3 shows the coupling assembly 1 according to the present invention in an open position of the clutch 3. In this position, according to the present invention, the first section 5 of the powertrain 2 is decoupled from the second section 6 of the powertrain 2.

According to the present exemplary powertrain 2 (FIG. 1), the first section 5 of the powertrain 2 thus corresponds to the primary driveline 51 including the main clutch 34, torque-transmitting element 36, and differential housing 20 of the rear-axle differential 31.

According to the present exemplary powertrain 2 (FIG. 1), the second section 6 of the powertrain 2 substantially corresponds to the secondary driveline 52, excluding the main clutch 34, torque-transmitting element 36, and differential housing 20 of the rear-axle differential 31.

The coupling assembly 1 comprises a clutch 3 and an actuation device 4, where the clutch 3 is adapted to be actuated selectively by means of the actuation device 4 to an open position and/or a closed position (FIG. 2; FIG. 3).

The coupling assembly 1 is arranged in the secondary driveline 52, the clutch 3 of the coupling assembly 1 in the present exemplary embodiment serving for coupling and/or decoupling the differential housing 20 of the rear-axle differential 31 to/from a differential shaft 21 or differential shaft support 22 of the rear-axle differential 31.

The actuation device 4 comprises an actuation element 7 and a control element 8.

The control element 8 is connected by way of a sliding element 39 to the clutch 3 and is designed to be pivotable about a pivot axis.

The control element 8 is arranged in a guidable manner in a guide slot 9 with respect to the actuation element 7.

In the closed position of the clutch 3, the control element 8 is held in the region of the guide slot 9 by means of an energy storage element 10, which counteracts a movement of the control element 8 out of a first stop position 11 along the guide slot 9 (FIG. 2).

The actuation element 7 has on its first end portion 13 the guide slot 9 and on a second end portion 14 an engaging portion 18.

The guide slot 9 is formed in the present case as an oblong hole, and the energy storage element 10 is arranged in the guide slot 9.

The energy storage element 10 is formed here as a compression spring.

The first stop position 11 is formed by a first guide slot end 16—in relation to the exemplary present illustrations of the coupling assembly 1 of the present invention in FIG. 2 to FIG. 9, the first guide slot end 16 is located to the left of the energy storage element 10.

The actuation element 7 is placed in contact, in the region of its first end portion 13, with the inside of an outer housing 42 by way of a shoulder 40 and a resilient contact element 41, in the present case also a spring element. The outer housing 42 has on its inside a contact slot 43 matching the contact of the contact element 41.

The control element 8 engages, in the region of the first stop position 11, with the guide slot 9 of the actuation element 7. The actuation element 7 thus is arranged in a guidable manner, against the spring force of the energy storage element 10, in the direction toward a second stop position 12 in the guide slot 9 on the control element 8.

The second stop position 12 is formed by a second guide slot end 17, opposite the first stop position 11. Referring to FIG. 2 to FIG. 9, the second guide slot end 17 is located to the right of the energy storage element 10.

The possible guiding direction of the actuation element 7 substantially corresponds to the structural design of the guide slot 9—in the present case the guide slot is formed in the direction of a longitudinal axis 15 of the actuation element 7.

In addition, the actuation device 4 has a threaded portion 19. The threaded portion 19, in the exemplary embodiment of the coupling assembly 1 according to the present invention in FIG. 1 to FIG. 9, is arranged on an exterior 44 of the differential housing 20 of the rear-axle differential 31.

The engaging portion 18 formed on the first end portion 13 of the actuation element 7 is adapted to be brought into engagement with the threaded portion 19.

The threaded portion 19 is formed such that the actuation element 7, on engagement of the engaging portion 18 with the threaded portion 19, is adapted to be moved relative to the threaded portion in an axial direction—in the indicated FIGS. 2 to 9 to the left in the direction of the outer housing 42.

The engaging portion 18 has a structural shape corresponding to that of the threaded portion 19, to enable a reliable positive-locking engagement of the engaging portion 18 with the threaded portion 19.

The threaded portion 19 is arranged on the exterior 44 of the differential housing 20 in a non-rotatable and not axially displaceable manner, and/or formed in one piece with the differential housing 20.

The engaging portion 18 is adapted to be brought into engagement with the threaded portion 19 by means of an actuator unit 23 adapted to be electrically actuated. Actuation of the actuation element 7 takes place by means of the actuator unit 23.

The actuator unit 23 is formed as a linear drive unit, in the present case a solenoid having a plunger 45 adapted for linear travel.

The plunger 45 of the solenoid is electromagnetically moved linearly in a radial direction.

The actuator unit 23 is arranged on the outer housing 42 on a side remote from the engaging portion 18 of the actuation element 7.

Disposed between the actuator unit 23 and the actuation element 7 is a pivotable guide element 24.

The actuator unit 23 is adapted to actuate the guide element 24, and the guide element 24, in turn, is adapted to actuate the actuation element 7.

The guide element 24 is pivotally fixed on a first guide element end 46 on the outer housing 42 and is arranged substantially parallel to the actuation element 7 on the side remote from the engaging portion 18 of the actuation element 7, between the actuator unit 23 and the actuation element 7.

The guide element 24 is pivotally connected on a second guide element end 47 to the plunger 45 of the actuator unit 23.

In addition, the guide element 24 has on the second guide element end 47, on the side nearer the actuation element 7, a locking portion 48.

The guide element 24, also, constitutes part of the actuation device 4.

Additionally, the first end portion 13 of the actuation element 7, on the side of the actuation element 7 remote from the engaging portion 18, has a locking shoulder 25 formed thereon.

The clutch 3 is formed as a positive-locking clutch, in the present case as a dog clutch having a clutch sleeve 49 and a clutch jaw 50.

The clutch sleeve 49 interacts in a positive-locking manner with the clutch jaw 50. The clutch sleeve 49 is axially displaceable and pivotally connected to the control element 8.

Pivoting of the control element 8 is effected by an axial movement of the actuation element 7. The pivoting movement of the control element 8, in turn, effects an axial displacement of the clutch sleeve 49 in the direction of the open position of the clutch 3—in FIG. 2 to FIG. 9 to the left in the direction of the outer housing 42, and/or in the direction of the closed position of the clutch 3—in FIG. 2 to FIG. 9 to the right, away from the outer housing 42.

The clutch jaw 50 is fixedly arranged on the differential shaft support 22.

The configuration according to the invention of the coupling assembly 1 enables in particular a reliable actuation of the clutch 3 from a closed position to an open position and thus a decoupling of the first section 5 of the powertrain 2 from the second section 6 of the powertrain 2 to be implemented.

The configuration according to the invention of the first stop position 11 and energy storage element 10, however, also ensure that the clutch 3 can be actuated rapidly from an open position to a closed position (coupling of the first part 5 of the powertrain 2 to the second section 6 of the powertrain 2).

In the exemplary powertrain 2 shown in FIG. 1 of an all-wheel driven motor vehicle, the drive torque, inter alia, which is transmitted by the main clutch 34 to the rear axle 31, hereinafter referred to as the main clutch torque, is utilized to positively complete the decoupling process (decoupling) of the first section 5 of the powertrain 2 from the second section 6 of the powertrain 2.

The actuating energy for the decoupling process of the first section 5 of the powertrain 2 from the second section 6 of the powertrain 2 is thus generated from within the powertrain 2 itself.

The main clutch torque generally equals an input torque of the coupling assembly 1, with the input torque of the coupling assembly 1 generally equaling a displacement force of the actuation element 7 when the engaging portion 18 engages with the threaded portion 19.

Depending on the degree of the main clutch torque—high main clutch torque or low main clutch torque—the decoupling processes in the coupling assembly 1 of the present invention will progress differently.

A high main clutch torque equals a high displacement force of the actuation element 7 when the engaging portion 18 engages with the threaded portion 19 on the differential housing 20.

A low main clutch torque equals a low displacement force of the actuation element 7 when the engaging portion 18 engages with the threaded portion 19 on the differential housing 20.

The design of the coupling assembly 1 according to the present invention achieves, in particular, a no-load, torque-independent decoupling of the first section 5 of the powertrain 2 from the second section 6 of the powertrain 2.

The decoupling process of the first section 5 of the powertrain 2 corresponds to an actuation of the clutch 3 from a closed position to an open position, with the opening of the clutch 3 in the present exemplary embodiment in FIG. 2 to FIG. 9 taking place always by an axial movement of the clutch sleeve 49 to the left.

The coupling process (coupling) of the first section 5 of the powertrain 2 corresponds to an actuation of the clutch 3 from an open position to a closed position, with the closing of the clutch 3 in the present exemplary embodiment in FIG. 2 to FIG. 9 taking place always by an axial movement of the clutch sleeve 49 to the right.

Figure 4:
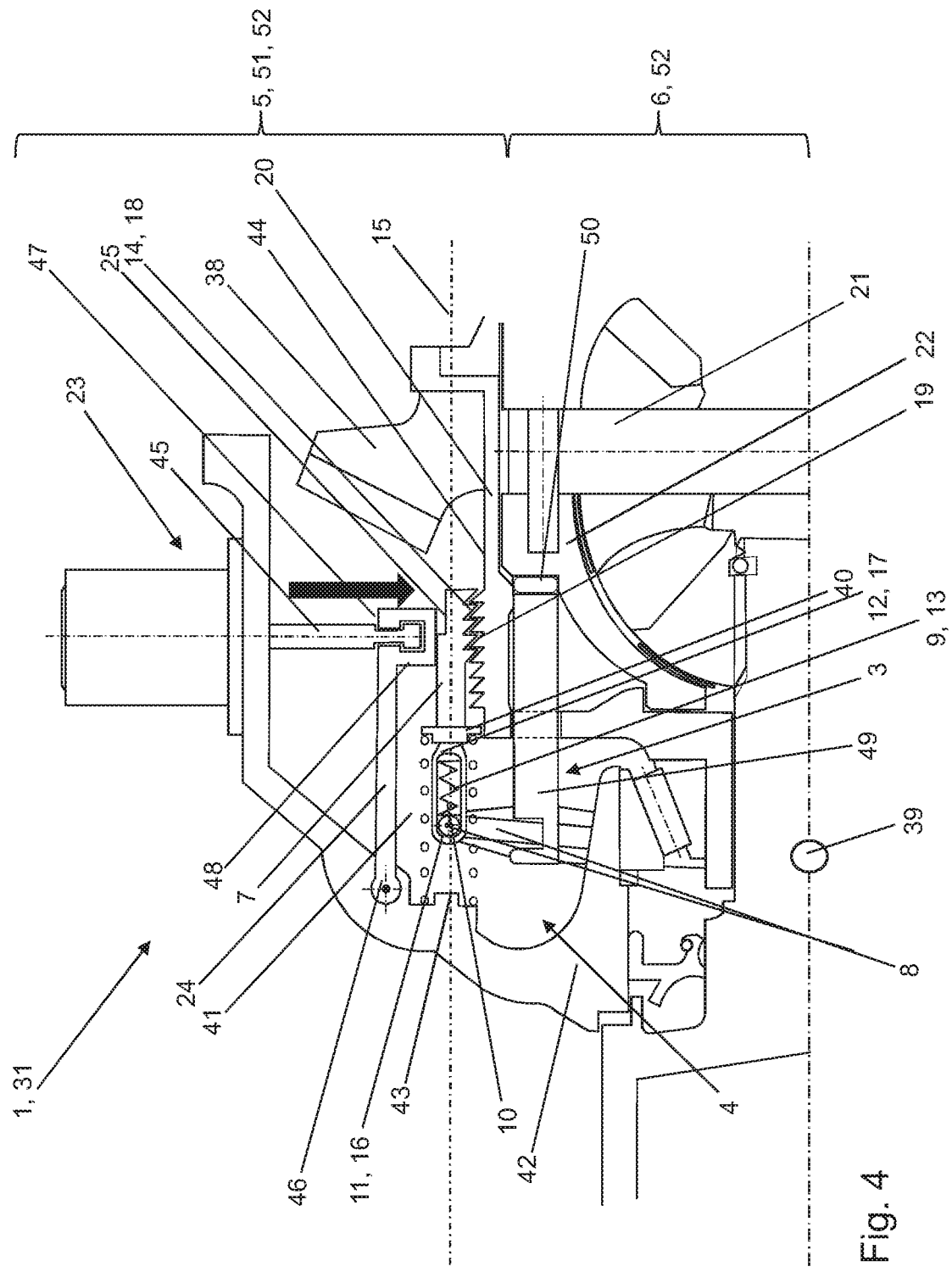
FIG. 4 shows a schematic illustration of an actuation process for actuating a clutch from a closed position to an open position.

Every decoupling process of the first section 5 of the powertrain 2 from the second section 6 of the powertrain 2, independent of the main clutch torque, begins with an actuation process by means of the actuator unit 23 as shown in FIG. 4.

In the case of an all-wheel drive travel of the motor vehicle, the drive torque generated by the drive unit 26 is distributed to the front axle 29 and the rear axle 31. In the process, as described with reference to the exemplary powertrain 2 in FIG. 1, drive torque (main clutch torque) is transmitted, when the main clutch 34 is closed, by way of the ring gear 38, which is fixedly connected to the differential housing 20 of the rear-axle differential 31, from the primary driveline 51 by way of the main clutch 34 and torque-transmitting element 36 to the differential housing 20 of the rear-axle differential 31 and thus to the threaded portion 19, which is fixedly formed on the exterior of the differential housing 20.

Through electrical actuation of the actuator unit 23, the plunger 45 is moved linearly in a radial direction. Because of the pivot connection of the plunger 45 to the second guide element end 47, the guide element 24 is thus pivoted in the direction of the actuation element 7, and the guide element 24 thus presses the engaging portion 18 into the threaded portion 19. The arrow shown in FIG. 4 describes the radial direction of travel of the plunger 45 of the actuator unit 23.

Actuating the actuator unit 23 thus effects an engagement of the engaging portion 18 with the threaded portion 19, resulting in a movement of the actuation element 7 relative to the threaded portion 19 in an axial direction. In the embodiment shown in FIG. 2 to FIG. 9 of the coupling assembly 1 according to the present invention, the decoupling process of the clutch 3 results in an axial movement of the actuation element 7 to the left, i.e., in the direction of the outer housing 42.

During the decoupling process, in order to ensure full-time transmission of main clutch torque from the first section 5 of the powertrain 2 to the second section 6 of the powertrain 2 until the decoupling process is completed, the main clutch 34 is closed sufficiently far for the second section 6 of the powertrain 2 to positively rotate.

Figure 5:
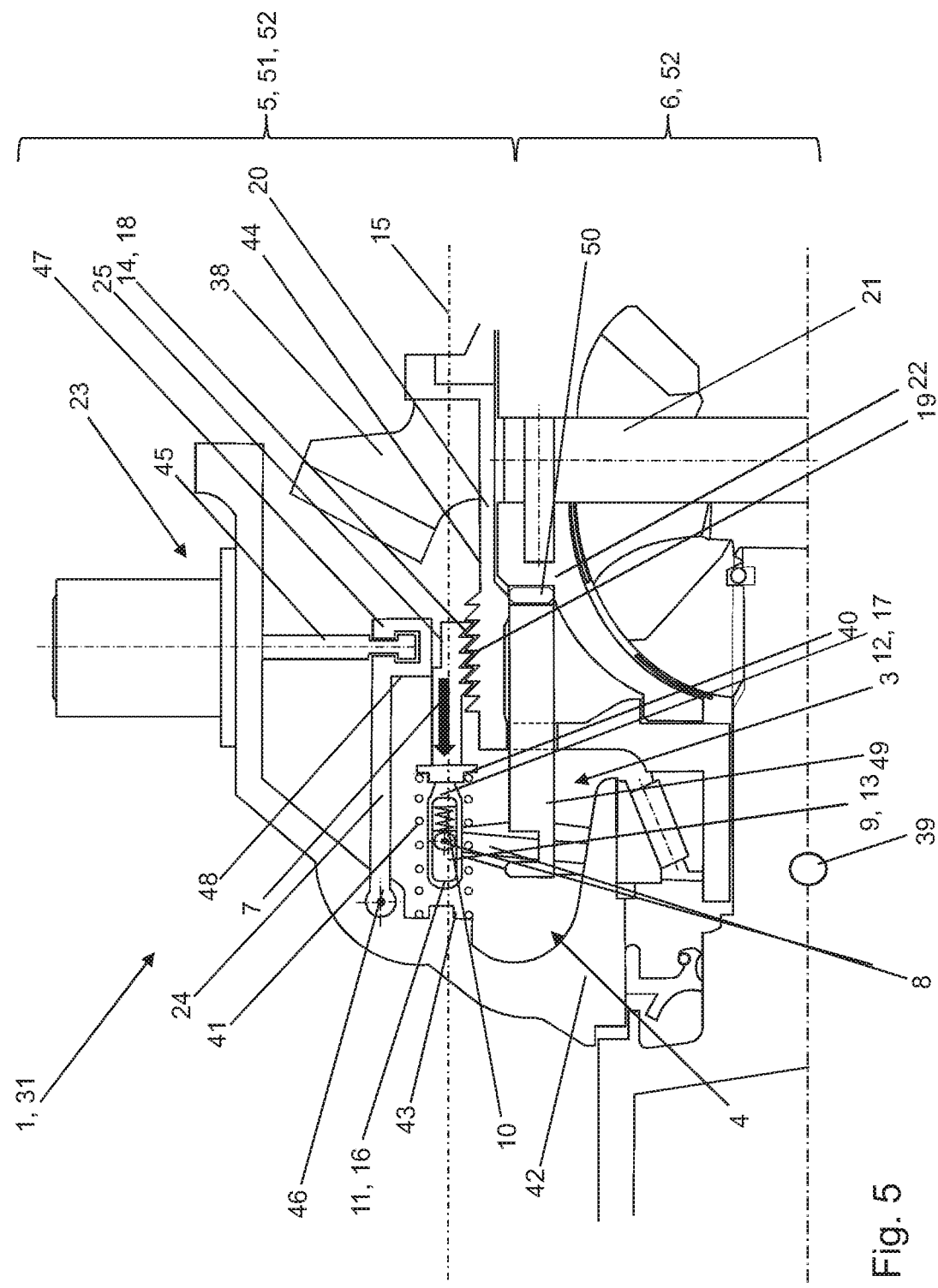
FIGS. 5-7 show a decoupling process of a first section of a powertrain from a second section of a powertrain at high displacement force.
Figure 6:
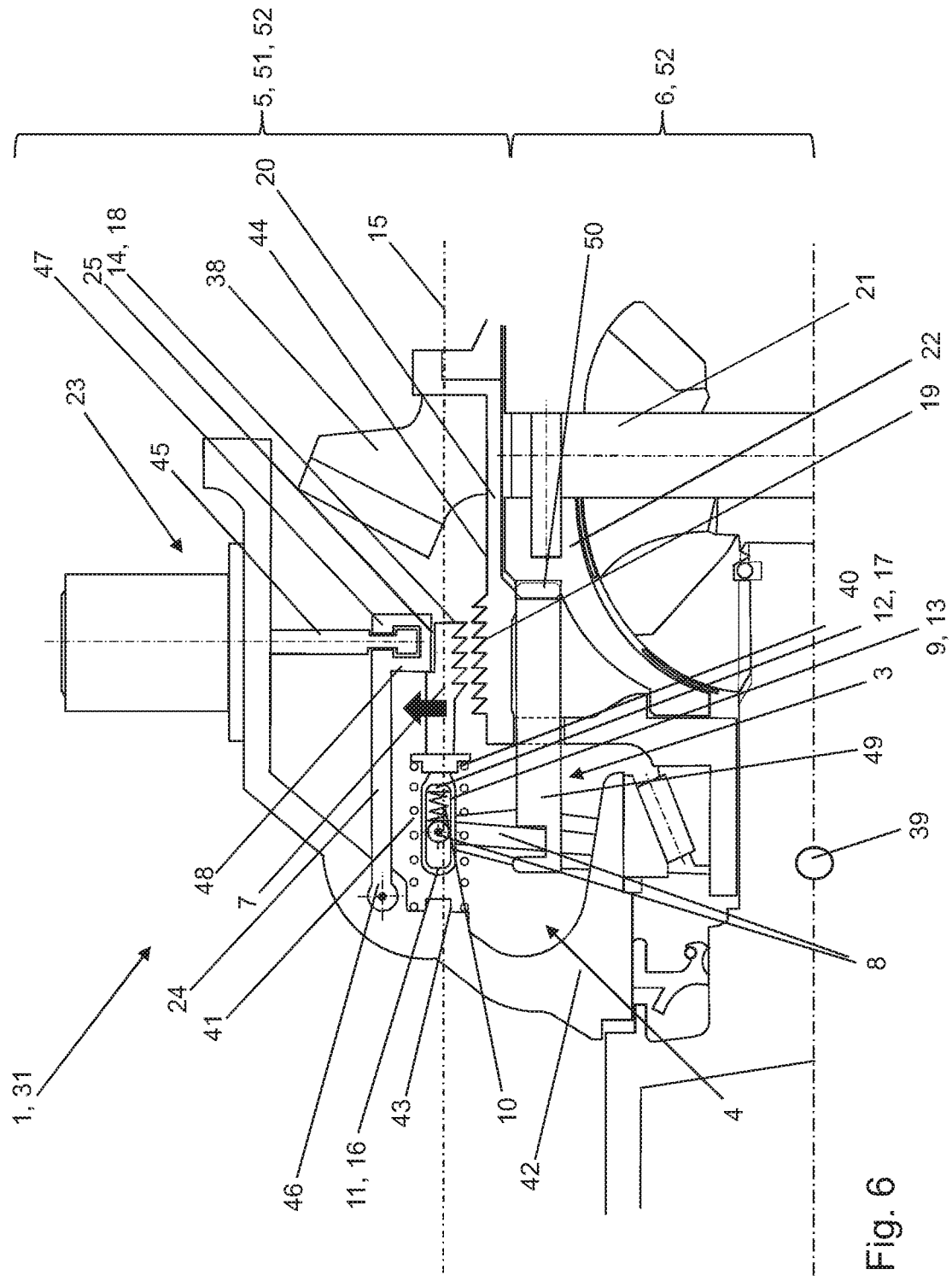
Figure 7:
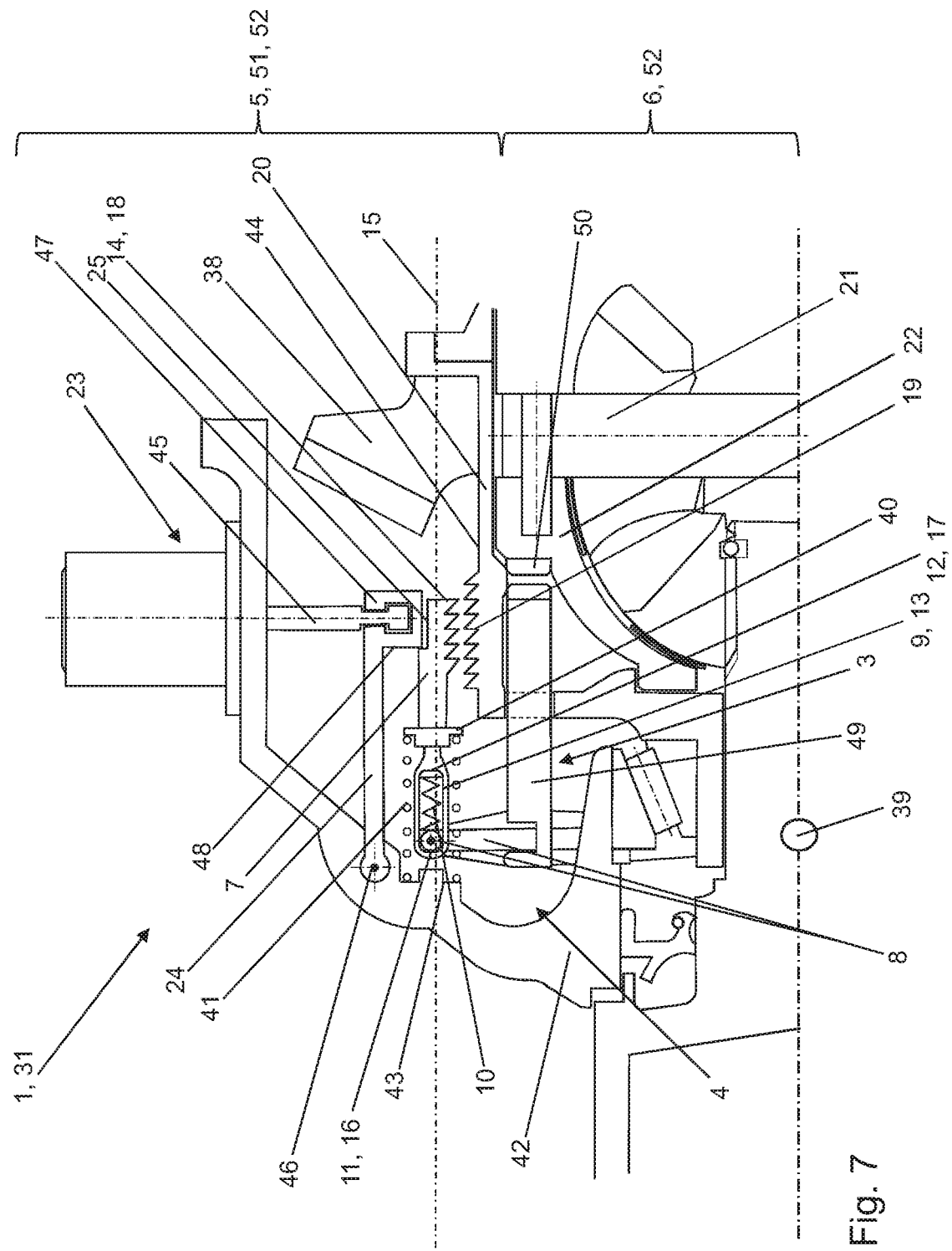

FIG. 5 to FIG. 7 show a decoupling process of the first section 5 of the powertrain 2 from the second section 6 of the powertrain 2 at high displacement force (high main clutch torque).

Upon engagement of the engaging portion 18 with the threaded portion 19, the actuation element 7 is moved against the spring force of the contact element 41 relative to the threaded portion 19 in an axial direction in the direction of the outer housing 42 (FIG. 5)—the direction of travel of the actuation element 7 is indicated by the arrow in FIG. 5.

At a high displacement force, i.e., high main clutch torque, an axial movement of the actuation element 7 on the control element 8 in the direction of the outer housing 42 and thus a contraction (biasing) of the energy storage element 10 within the guide slot 9 is produced—the position of the control element 8 remains unchanged, i.e., the clutch 3 remains in the closed position (FIG. 5).

Because of the high displacement force, the axial displacement process of the actuation element 7 completes, i.e., the actuation element 7 continues to be displaced axially until the locking portion 48 of the guide element 24 locks into place in the locking shoulder 25 of the actuation element 7 (FIG. 6).

Because of the energy storage element 10, the actuation element 7 thus is able to positively complete its displacement by means of the engaging portion 18 in the threaded portion 19 independently of the degree of the main clutch torque, and the locking portion 48 of the guide element 24 is able to lock into place in the locking shoulder 25 (FIG. 6).

As soon as the displacement force decreases, the control element 8 is pressed within the guide slot 9 in the direction of the first stop position 11 because of the bias of the energy storage element 10. As a result, the control element 8 is pivoted about the pivot axis and the clutch is thus opened (FIG. 7).

The main clutch 34 is opened only after the locking portion 48 of the guide element 24 is locked into place in the locking shoulder 25 (FIG. 6).

The energy storage element 10 is integrated in such a manner that it is being biased when the clutch 3 is opened at high input torque (main clutch torque), in other words, when the clutch 3 cannot be displaced.

This ensures that the clutch 3 will be disengaged by way of the energy stored in the energy storage element 10 when the main clutch torque is high.

Figure 8:
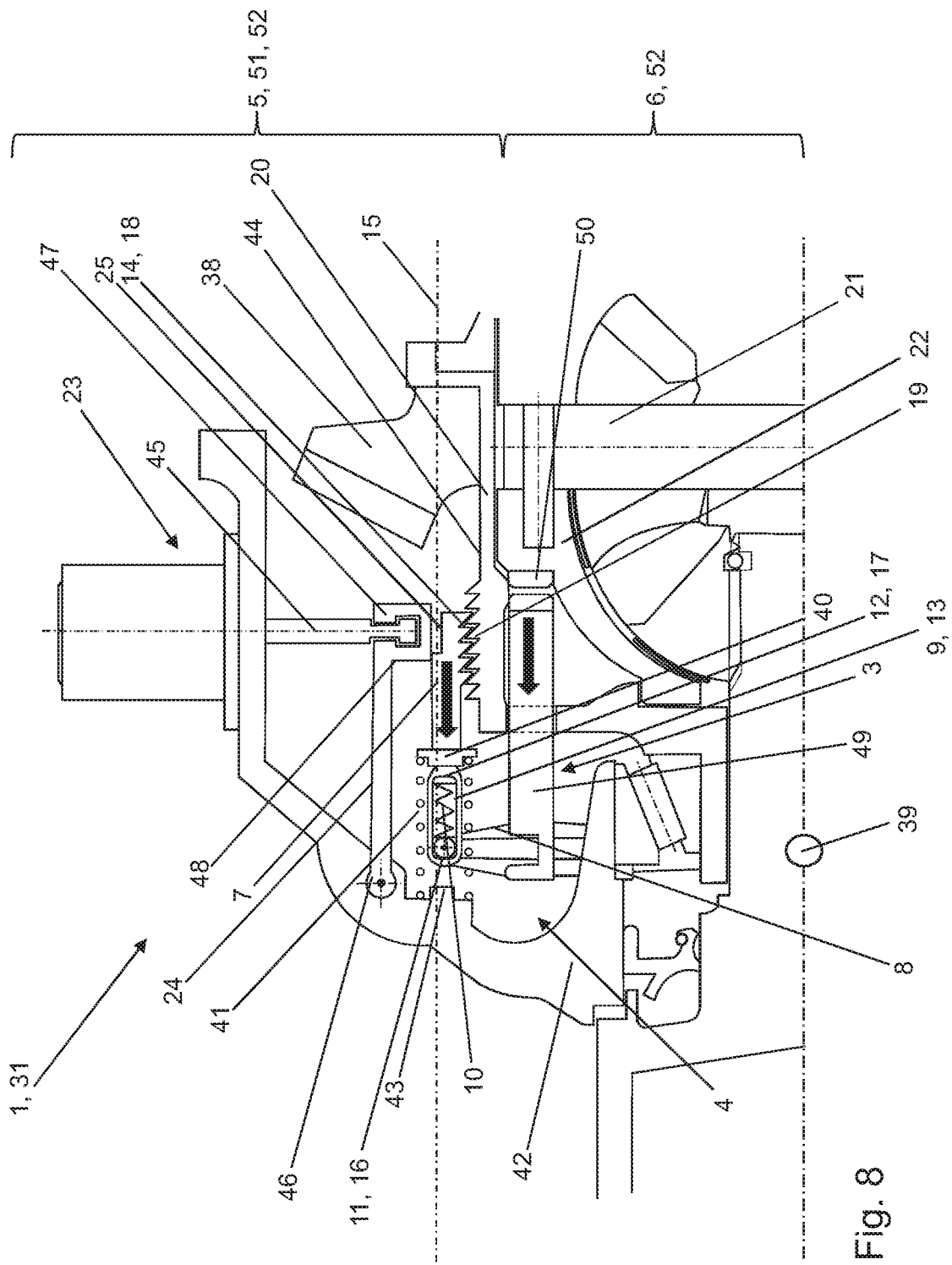
FIGS. 8-9 show a decoupling process of a first section of a powertrain from a second section of a powertrain at low displacement force.
Figure 9:
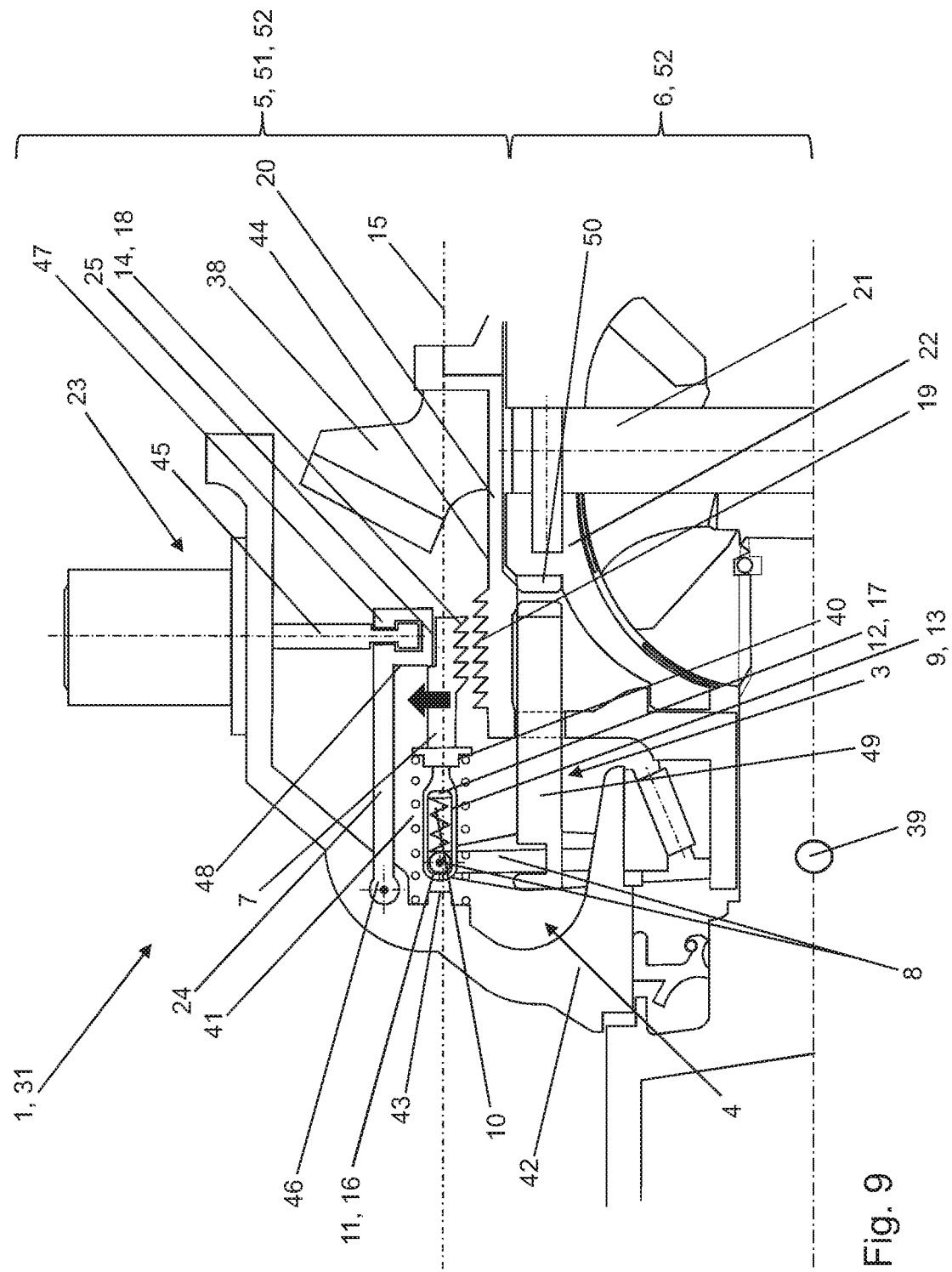

FIG. 8 to FIG. 9 show the decoupling process of the first section 5 of the powertrain 2 from the second section 6 of the powertrain 2 at low displacement force (low main clutch torque).

Here, too, engagement of the engaging portion 18 with the threaded portion 18 results in an axial movement of the actuation element 7 against the spring force of the contact element relative to the threaded portion in the direction of the outer housing; the direction of travel of the actuation element is indicated by the arrow in FIG. 8.

However, no contraction (biasing) of the energy storage element 10 takes place—the actuation element 7 and the control element 8 continue to be pressed by the energy storage element 10 in the direction of the first stop position 11. This leads to a pivoting of the control element 8 about the pivot axis and, hence, to an opening of the clutch 3 (FIG. 7). The opening direction of the clutch 3 and direction of travel of the actuation element 7 are marked by an arrow in FIG. 7.

Once the decoupling process is completed, the locking portion 48 of the guide element 24 locks into place in the locking shoulder 25 of the actuation element 7 (FIG. 9).

In order to again couple the first section 5 of the powertrain 2 to the second section 6 of the powertrain 2, i.e., to actuate the clutch 3 from the open position to the closed position, the plunger 45 of the actuator unit 23 is displaced in a radial direction in the direction of the actuator unit 23, and, hence, the guiding lever 24 is pivoted, such that the locking portion 48 of the guide element 24 moves out of the locking shoulder 25 of the actuation element 7. The contact element 41 that has likewise been biased by the decoupling process causes the actuation element 7 to move in a substantially axial direction away from the outer housing 42. The first stop position 11 causes the actuation element 7 and control element 8 to be carried along instantaneously. As a result, the actuation element 7 is pivoted about the pivot axis and causes an axial displacement of the clutch sleeve 49 in the direction of the clutch jaw 50—resulting in a positive-locking connection between the clutch sleeve 49 and clutch jaw 50 (FIG. 2).

The foregoing description of the embodiments has been provided for purposes of illustration and description. It is not intended to be exhaustive or to limit the disclosure. Individual elements or features of a particular embodiment are generally not limited to that particular embodiment but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

LIST OF REFERENCE NUMERALS 1 coupling assembly
2 powertrain 3 clutch
4 actuation device
5 first section (of the powertrain)
6 second section (of the powertrain)
7 actuation element
8 control element
9 guide slot
10 energy storage element
11 first stop position
12 second stop position
13 first end portion (of the actuation element)
14 second end portion (of the actuation element)
15 longitudinal axis (of the actuation element)
16 first guide slot end
17 second guide slot end
18 engaging portion
19 threaded portion
20 differential housing
21 differential shaft
22 differential shaft support
23 actuator unit
24 guide element
25 locking shoulder
26 drive unit
27 variable-speed transmission
28 front-axle differential
29 front axle
30 front wheel
31 rear-axle differential
32 rear axle
33 rear wheel
34 main clutch
35 output element
36 torque-transmitting element
37 input element
38 ring gear
39 sliding element
40 shoulder
41 contact element
42 outer housing
43 contact slot
44 exterior (of the differential housing)
45 plunger
46 first guide element end
47 second guide element end
48 locking portion
49 clutch sleeve
50 clutch jaw
51 primary driveline
52 secondary driveline
53

What is claimed is:

1. A coupling assembly for a powertrain of a motor vehicle, comprising at least one clutch and at least one actuation device, the clutch being adapted to be brought into an open position and/or closed position by means of the actuation device such that a first section of the powertrain and a second section of the powertrain are decoupled and/or coupled, the actuation device comprising an actuation element and a control element which is connected to the clutch, characterized in that the control element is arranged in a guidable manner in a guide slot with respect to the actuation element, and the control element is held in the region of the guide slot by means of an energy storage element, which counteracts a movement of the control element out of a first stop position along the guide slot, in the closed position of the clutch, and the actuation device has an engaging portion and a threaded portion, wherein the engaging portion is adapted to be brought into engagement with the threaded portion and the threaded portion is arranged on a differential housing in a non-rotatable and not axially displaceable manner.

2. The coupling assembly according to claim 1, wherein the guide slot is formed on a first end portion of the actuation element.

3. The coupling assembly according to claim 1, wherein the guide slot is formed as an oblong groove or an oblong guide rail extending along a longitudinal axis of the actuation element.

4. The coupling assembly according to claim 1, wherein the first stop position is formed by a first guide slot end.

5. The coupling assembly according to claim 1, wherein the energy storage element is formed as a resilient element.

6. The coupling assembly according to claim 5, wherein the resilient element is a spring element.

7. The coupling assembly according to claim 1, wherein the energy storage element is arranged within the guide slot.

8. The coupling assembly according to claim 1, wherein the actuation element is supported by way of a resilient contact element on an outer housing.

9. The coupling assembly according to claim 1, wherein the differential housing is adapted to be coupled by means of the clutch to a differential shaft or a differential shaft support.

10. The coupling assembly according to claim 1, wherein the engaging portion is formed on a second end portion of the actuation element.

11. The coupling assembly according to any of claim 10, wherein a locking shoulder is formed on the second end portion of the actuation element on the side of the actuation element remote from the engaging portion.

12. The coupling assembly according to claim 1, wherein the engaging portion is adapted to be brought into engagement with the threaded portion by means of an actuator unit.

13. The coupling assembly according to claim 12, wherein the actuator unit is formed as a linear drive unit which can be electrically actuated.

14. The coupling assembly according to claim 12, wherein a guide element is adapted to be actuated by means of the actuator unit, wherein the guide element is adapted to actuate the actuation element, thereby enabling the engaging portion to be brought into engagement with the threaded portion.

15. The coupling assembly according to claim 1, wherein the clutch is formed as a positive-locking clutch.

* * * * *